United States Patent
Chen et al.

(10) Patent No.: US 10,761,535 B2
(45) Date of Patent: Sep. 1, 2020

(54) INTELLIGENT VEHICLE NAVIGATION SYSTEMS, METHODS, AND CONTROL LOGIC FOR MULTI-LANE SEPARATION AND TRAJECTORY EXTRACTION OF ROADWAY SEGMENTS

(71) Applicant: GM Global Technology Operations LLC, Detroit, MI (US)

(72) Inventors: Shu Chen, Rochester Hills, MI (US); Fan Bai, Ann Arbor, MI (US); Donald K. Grimm, Utica, MI (US); Jinzhu Chen, Troy, MI (US); Bo Yu, Troy, MI (US); David E. Bojanowski, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 84 days.

(21) Appl. No.: 16/107,272

(22) Filed: Aug. 21, 2018

(65) Prior Publication Data
US 2020/0064846 A1 Feb. 27, 2020

(51) Int. Cl.
*G05D 1/02* (2020.01)
*G06K 9/00* (2006.01)
(Continued)

(52) U.S. Cl.
CPC .......... *G05D 1/0212* (2013.01); *G01C 21/32* (2013.01); *G05D 1/0088* (2013.01); *G06F 16/29* (2019.01);
(Continued)

(58) Field of Classification Search
CPC ............... G05D 1/0212; G05D 1/0088; G05D 2201/0213; G06F 16/29; G01C 21/32; G06K 9/00798; G08G 1/096791
See application file for complete search history.

(56) References Cited

U.S. PATENT DOCUMENTS 6,356,838 B1 3/2002 Paul
6,697,730 B2 2/2004 Dickerson
(Continued)

FOREIGN PATENT DOCUMENTS

DE 102014016567 A1 5/2016

*Primary Examiner* — Navid Ziaeianmehdizadeh
*Assistant Examiner* — Sean P Quinn
(74) *Attorney, Agent, or Firm* — Quinn IP Law

(57) ABSTRACT

Presented are systems and methods for extracting lane-level information of designated road segments by mining vehicle dynamics data traces. A method for controlling operation of a motor vehicle includes: determining the vehicle's location; identifying a road segment corresponding to the vehicle's location; receiving road-level data associated with this road segment; determining a turning angle and centerline for the road segment; receiving vehicle data indicative of vehicle locations and dynamics for multiple vehicles travelling on the road segment; determining, from this vehicle data, trajectory data indicative of start points, end points, and centerline offset distances for these vehicles; identifying total driving lanes for the road segment by processing the trajectory data with a clustering algorithm given the turning angle and centerline; extracting virtual trajectories for the driving lanes; and commanding a vehicle subsystem to execute a control operation based on an extracted virtual trajectory for at least one driving lane.

20 Claims, 3 Drawing Sheets

(51) Int. Cl.
  *G01C 21/32* (2006.01)
  *G08G 1/09* (2006.01)
  *G05D 1/00* (2006.01)
  *G06F 16/29* (2019.01)
  *G05D 22/02* (2006.01)
  *G08G 1/0967* (2006.01)

(52) U.S. Cl.
  CPC ... *G06K 9/00798* (2013.01); *G08G 1/096791* (2013.01); *G05D 2201/0213* (2013.01)

(56) References Cited

U.S. PATENT DOCUMENTS

| | | |
|---|---|---|
| 7,266,438 B2 | 9/2007 | Kellum et al. |
| 7,589,643 B2 | 9/2009 | Dagci et al. |
| 7,739,036 B2 | 6/2010 | Grimm et al. |
| 7,840,427 B2 | 11/2010 | O'Sullivan |
| 8,050,855 B2 | 11/2011 | Coy et al. |
| 8,170,739 B2 | 5/2012 | Lee |
| 8,384,532 B2 | 2/2013 | Szczerba et al. |
| 8,428,843 B2 | 4/2013 | Lee et al. |
| 8,605,011 B2 | 12/2013 | Seder et al. |
| 8,612,139 B2 | 12/2013 | Wang et al. |
| 8,633,979 B2 | 1/2014 | Szczerba et al. |
| 8,692,739 B2 | 4/2014 | Mathieu et al. |
| 8,818,708 B2 | 8/2014 | Mathieu et al. |
| 8,849,515 B2 | 9/2014 | Moshchuk et al. |
| 8,996,273 B2 | 3/2015 | Lee et al. |
| 9,014,915 B2 | 4/2015 | Chatterjee et al. |
| 9,099,006 B2 | 8/2015 | Mudalige et al. |
| 9,229,453 B1 | 1/2016 | Lee |
| 9,283,967 B2 | 3/2016 | Lee |
| 9,443,429 B2 | 9/2016 | Mathieu et al. |
| 9,487,212 B1 | 11/2016 | Adam et al. |
| 9,868,443 B2 | 1/2018 | Zeng et al. |
| 2009/0030885 A1 | 1/2009 | DePasquale et al. |
| 2010/0228415 A1 | 9/2010 | Paul |
| 2011/0059693 A1 | 3/2011 | O'Sullivan |
| 2011/0313880 A1 | 12/2011 | Paul et al. |
| 2012/0101713 A1 | 4/2012 | Moshchuk et al. |
| 2012/0239452 A1 | 9/2012 | Trivedi et al. |
| 2013/0032421 A1 | 2/2013 | Bonne et al. |
| 2013/0035821 A1 | 2/2013 | Bonne et al. |
| 2013/0054128 A1 | 2/2013 | Moshchuk et al. |
| 2013/0204676 A1 | 8/2013 | Hindi et al. |
| 2013/0219294 A1 | 8/2013 | Goldman-Shenhar et al. |
| 2014/0011522 A1 | 1/2014 | Lin et al. |
| 2015/0077270 A1* | 3/2015 | Rubin ............... G08G 9/02 340/903 |
| 2015/0353082 A1 | 12/2015 | Lee et al. |
| 2015/0353085 A1 | 12/2015 | Lee |
| 2016/0102986 A1* | 4/2016 | Ma ............... G01C 21/32 702/5 |
| 2016/0231124 A1 | 8/2016 | Nickolaou et al. |
| 2016/0260328 A1* | 9/2016 | Mishra ............... G08G 1/163 |
| 2016/0320194 A1 | 11/2016 | Liu et al. |
| 2016/0320195 A1 | 11/2016 | Liu et al. |
| 2016/0320198 A1 | 11/2016 | Liu et al. |
| 2016/0321566 A1 | 11/2016 | Liu et al. |
| 2016/0321771 A1 | 11/2016 | Liu et al. |
| 2017/0021830 A1 | 1/2017 | Feldman et al. |
| 2017/0316684 A1* | 11/2017 | Jammoussi ............. G06T 11/60 |
| 2018/0257660 A1* | 9/2018 | Ibrahim ............... G01C 21/16 |
| 2018/0364700 A1* | 12/2018 | Liu ............... G05D 1/0038 |
| 2018/0374341 A1* | 12/2018 | Branson ............... G08G 1/052 |
| 2019/0369626 A1* | 12/2019 | Lui ............... G05D 1/0219 |
| 2019/0378412 A1* | 12/2019 | Zhu ............... G05D 1/0214 |

* cited by examiner

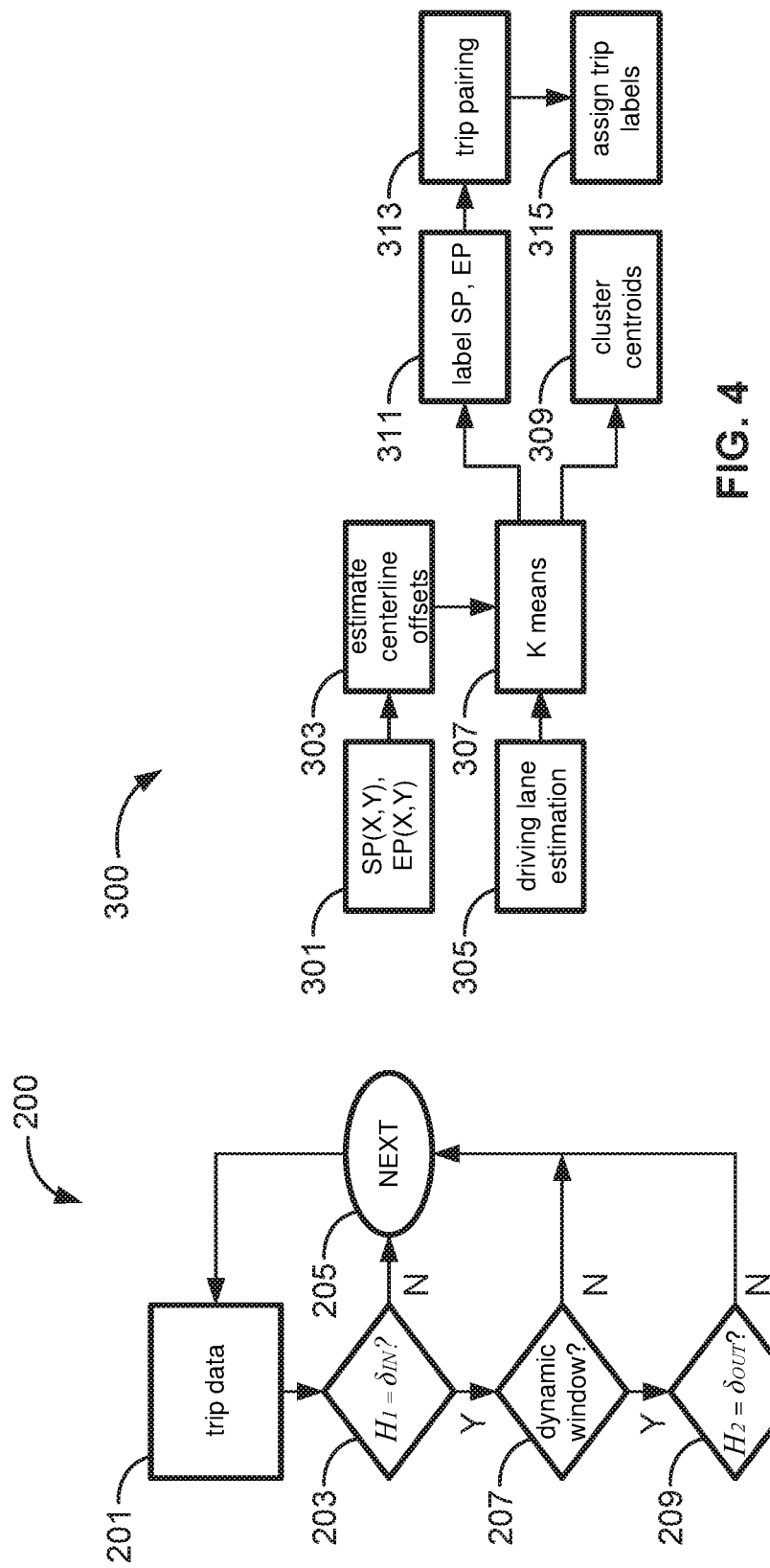

INTELLIGENT VEHICLE NAVIGATION SYSTEMS, METHODS, AND CONTROL LOGIC FOR MULTI-LANE SEPARATION AND TRAJECTORY EXTRACTION OF ROADWAY SEGMENTS

INTRODUCTION

The present disclosure relates generally to vehicle navigation systems with road mapping capabilities. More specifically, aspects of this disclosure relate to intelligent navigation systems and control logic for estimating roadway segment layout.

Current production motor vehicles, such as the modern-day automobile, are originally equipped with or retrofit to include a network of onboard electronic devices that provide automated driving capabilities that help to minimize driver effort. In automotive applications, for example, the most recognizable type of automated driving feature is the cruise control system, which allows a vehicle operator to set a particular vehicle speed and have the onboard vehicle computer system maintain that speed without the driver operating the accelerator or brake pedals. Next-generation Adaptive Cruise Control (ACC) is a computer-automated driving feature that regulates vehicle speed while concomitantly managing fore and aft spacing between the host vehicle and leading/trailing vehicles. Another type of automated driving feature is the Collision Avoidance System (CAS), which detects imminent collision conditions and provides a warning to the driver while also taking preventative action autonomously, e.g., by steering or braking without driver input. Intelligent Parking Assist Systems (IPAS), Lane Monitoring and Automated Steering ("Auto Steer") Systems, and other Advanced Driver Assistance Systems (ADAS) and autonomous driving features are also available on many modern-day automobiles.

As vehicle processing, communication, and sensing capabilities continue to improve, manufacturers will persist in offering more system-automated driving capabilities with the aspiration of eventually offering fully autonomous vehicles competent to operate among heterogeneous vehicle types in both urban and rural scenarios. Original equipment manufacturers (OEM) are moving towards vehicle-to-infrastructure (V2I) and vehicle-to-vehicle (V2V) "talking" cars with higher-level driving automation that employ autonomous systems to enable vehicle routing with steering, lane changing, scenario planning, etc. Automated route generation systems utilize vehicle state and dynamics sensors, map and road condition data, and path prediction algorithms to provide path generation with automated lane center and lane change forecasting. Computer-assisted rerouting techniques offer predicted alternative travel routes that may be updated, for example, based on real-time and virtual vehicle data.

Many automobiles are now equipped with an onboard vehicle navigation system that utilizes a global positioning system (GPS) transceiver in cooperation with navigation software and a mapping database to obtain roadway layout, traffic and speed limit information associated with the vehicle's current location. ADAS and autonomous driving systems are often able to adapt certain automated driving maneuvers based on roadway information obtained by the in-vehicle navigation system. Vehicular ad-hoc-network-based ADAS, for example, employ GPS and mapping data in conjunction with multi-hop geocast V2V and V2I data exchanges to facilitate automated vehicle maneuvering to and through roadway intersections. However, roadway information stored in the mapping database may become obsolete and may not provide comprehensive information beyond roadway name, alignment, traffic, and speed limit. Additionally, employing a fleet of survey vehicles to update database-stored roadway information is extremely costly and time consuming.

SUMMARY

Disclosed herein are intelligent vehicle navigation systems and attendant control logic for extracting multi-lane separation and trajectory information of roadway segments, methods for manufacturing and methods for operating such systems, and motor vehicles equipped with intelligent navigation systems having lane-level data assessment capabilities. By way of example, there are presented novel systems and methods for provisioning multi-lane separation and virtual trajectory extraction at road intersections by mining GPS-generated vehicle dynamics data traces. A representative method uses road-level navigation maps, such as an OPENSTREETMAP® (OSM) database, as a baseline source to derive an initial estimate of lane-level intersection topology. The method may generate lane-specific turning window estimates based on aggregated yaw rate and heading data, and employ a clustering algorithm to combine start points, end points, and perpendicular distances to derive a number of drivable lanes for each segment of a particular intersection. Lane-specific turning rules may be extracted by examining a statistical distribution of lane-oriented turning behaviors of third-party vehicles traversing a given intersection.

Disclosed techniques help to derive lane-level details for roadway intersections and other road segments in navigation map databases, which improves the integrity and functionality of automated and assisted vehicle navigation. Road-level data is generally limited to a number of road segments meeting at a given intersection (3-way intersection, 4-way intersection, 5-way intersection, etc.), a name for each road segment, a speed limit for each road segment, and basic lane alignment information. Lane-level data for a given road segment, on the other hand, may include: a total number of lanes (single-lane road, two-lane, two-way road, two-way road with center turn lane, etc.); a number of left-hand turn lanes (if any), a number of right-hand turn lanes (if any), and a number of straightaway lanes (if any); turning rules for each lane (e.g., dedicated right-turn only, dedicated left-turn only, straight and left-turn lane, etc.); virtual trajectory data (e.g., making turn onto street with option of multiple lanes), etc. Disclosed statistical techniques enable accurate, real-time lane-level data retrieval using baseline map database information and contributing "crowd-sourced" vehicles as sensors. Additionally, aggregating data from a large, open group of participating vehicles helps to eliminate the need for dedicated survey vehicles and, thus, significantly reduces the time and costs associated with updating database-stored roadway information. In addition to provisioning less costly, more timely updates, disclosed systems and methods help to improve ADAS and autonomous driving functionality.

Aspects of this disclosure are directed to probabilistic modeling techniques and computer-executable algorithms for estimating one or more distinct parameters of an observed dynamic driving environment. For instance, methods are presented for modulating a controller-regulated operation of a motor vehicle based on road segment trajectory and lane separation data derived through statistical analysis of vehicle dynamics data traces. A representative method for controlling operation of a motor vehicle includes, in any order and in any combination with any of the above and below disclosed options and features: determining, e.g., via a resident vehicle controller of the motor vehicle through cooperative operation with a GPS transceiver, cellular data chip, etc., a location of the motor vehicle; conducting, e.g., via the resident vehicle controller through cooperative operation with a resident vehicle navigation system or a remote third-party navigation data provider, a geospatial query to identify a designated road segment corresponding to the vehicle's location; and, receiving, e.g., by the resident vehicle controller from a resident or remote memory-stored map database, road-level data associated with the designated road segment.

Continuing with the above example, the method may further comprise: determining, e.g., by a high-speed, server-class computer of a host cloud computing platform, a turning angle and centerline for the designated road segment based on the road-level data; receiving, e.g., via the remote server computer, connected vehicle data indicative of vehicle locations and dynamics for multiple motor vehicles travelling on the designated road segment; determining, from this connected vehicle data, trajectory data indicative of respective start points, end points, and centerline offset distances for the multiple motor vehicles; identifying, e.g., via the remote server computer given the turning angle and centerline, a number of driving lanes for the designated road segment by processing the trajectory data with a clustering algorithm; extracting a respective virtual trajectory for each driving lane; and, transmitting some or all the foregoing lane-level data to the motor vehicle. The resident vehicle controller responsively transmits one or more command signals to a resident vehicle subsystem to execute a control operation based on one or more of the extracted virtual trajectories for one or more of the driving lanes of the designated road segment.

Other aspects of the present disclosure are directed to intelligent vehicle navigation systems for deriving lane-level roadway information through statistical analysis of crowd-sensed data aggregated from multiple participatory motor vehicles. As used herein, the term "motor vehicle" may include any relevant vehicle platform, such as passenger vehicles (internal combustion engine, hybrid, full electric, fuel cell, etc.), commercial vehicles, industrial vehicles, tracked vehicles, off-road and all-terrain vehicles (ATV), motorcycles, etc. In addition, the terms "assisted" and "automated" and "autonomous" may be used with respect to any relevant vehicle platform that may be classified as a Society of Automotive Engineers (SAE) Level 2, 3, 4 or 5 vehicle. SAE Level 0, for example, is generally typified as "unassisted" driving that allows for vehicle-generated warnings with momentary intervention, but otherwise relies solely on human control. By comparison, SAE Level 3 allows for unassisted, partially assisted, and fully autonomous driving with sufficient vehicle automation for full vehicle control (steering, speed, acceleration/deceleration, etc.), while obliging driver intervention within a calibrated timeframe. At the upper end of the spectrum is Level 5 automation that altogether eliminates human intervention (e.g., no steering wheel, gas pedal, or shift knob).

In an example, an intelligent vehicle navigation system includes a remote system server computer operable to communicate with multiple motor vehicles. Each motor vehicle includes a vehicle body, a vehicle powertrain attached to and operable for propelling the vehicle body, and a vehicle navigation system with a location tracking device and a graphical human machine interface (HMI) attached to the vehicle body. A resident vehicle controller is attached to the vehicle body and operatively connected to the vehicle powertrain and navigation systems. The resident vehicle controller is programmed to execute memory-stored instructions to: determine, via the location tracking device of the vehicle navigation system, the motor vehicle's location; determine, via the vehicle navigation system, a designated road segment corresponding to the vehicle's location; and receive, via the vehicle navigation system from a memory-stored map database, road-level data associated with the designated road segment.

Continuing with the above example, the remote system server computer is programmed to execute memory-stored instructions to: determine, from the road-level data, a turning angle and centerline for the designated road segment; receive connected vehicle data indicative of vehicle locations and dynamics for multiple motor vehicles travelling on the designated road segment; determine, from the connected vehicle data, trajectory data indicative of respective start points, end points, and centerline offset distances for the multiple motor vehicles; identify a number of driving lanes for the designated road segment by processing the trajectory data with a clustering algorithm given the road segment's turning angle and centerline; and, extract a respective virtual trajectory for each driving lane. The resident vehicle controller is operable to receive one or more of the extracted virtual trajectories from the remote system server computer, and responsively transmit one or more command signals to a resident vehicle subsystem to execute a control operation based on one or more of the extracted virtual trajectories.

For any of the disclosed systems, methods, and vehicles, determining a turning angle for a designated road segment may include determining, from the corresponding road-level data, an entry (IN) angle $\delta_{IN}$ and an exit (OUT) angle $\delta_{OUT}$, and calculating the turning angle as $\theta_T$, where $\theta_T = \delta_{OUT} - \delta_{IN}$. In this instance, determining a centerline for a given road segment may include determining intersection center point coordinates $x_0$, $y_0$ from the road-level data, and determining entry and exit angles $\delta_{IN}$ and $\delta_{OUT}$, respectively, from the road-level data. An entry centerline $L_{IN}$ is calculated as $(y_{IN} - y_0) = \delta_{IN}(x_{IN} - x_0)$, whereas an exit centerline $L_{OUT}$ is calculated as $(y_{OUT} - y_0) = \delta_{OUT}(x_{OUT} - x_0)$.

For any of the disclosed systems, methods, and vehicles, extracting a respective virtual trajectory for a corresponding driving lane may include estimating a respective start heading $H_1$, a respective end heading $H_2$, and a respective turning angle $\theta_1$ for the corresponding driving lane. Estimating a respective turning angle may include estimating the turning angle as $\theta_1$, where $\theta_1 = \int Y dt$, and where Y is a yaw rate and dt is a time derivative. In this instance, each start point may be identified as a first location whereat the vehicle's yaw rate starts to increase/decrease away from a calibrated threshold estimate; each end point, on the other hand, may be identified as a second location whereat the vehicle's yaw rate increases/decreases back to this calibrated threshold estimate.

For any of the disclosed systems, methods, and vehicles, processing the trajectory data with the clustering algorithm includes identifying the number of driving lanes as an estimated number of clusters K, where $K = \text{Max}(\text{Diff}_{pd})/W_{lane}$, and where $\text{Diff}_{pd}$ is a difference among start points centerline offset distances or end points centerline offset distances, and $W_{lane}$ is a standardized lane width corresponding to the designated road segment. As yet another option, determining a centerline offset distance for a participating vehicle may include calculating a respective perpendicular distance PD from the centerline as $(|aX+bY+c|)/\sqrt{(a^2+b^2)}$, where $aX+bY+c$, which may be set equal to zero (0), is a linear equation representing the center line, X is a start point, and Y is an end point.

For any of the disclosed systems, methods, and vehicles, identifying the designated road segment corresponding to the vehicle's location may include determining a (square or rectangular) bounding box that delineates a set of geographical boundaries surrounding the vehicle's location. In some applications, the number of driving lanes for a designated road segment may include a single lane or multiple lanes (e.g., first, second, third, . . . N driving lanes); concomitantly, a single virtual trajectory or multiple virtual trajectories may be extracted for a single lane or a single virtual trajectory or multiple virtual trajectories may be extracted for each of multiple lanes. As an example, a first virtual trajectory may be extracted for a first driving lane and a second virtual trajectory, distinct from the first virtual trajectory, may be extracted for a second driving lane. Optionally, third and fourth virtual trajectories, distinct from the first and second virtual trajectories, may be extracted for a third driving lane.

For any of the disclosed systems, methods, and vehicles, the resident vehicle subsystem may include an ADAS intersection assistance system or other suitable vehicle steering and braking control system. In this instance, the control operation may include executing an automated steering and/or braking maneuver adapted by the ADAS intersection assistance module based on at least one of the extracted virtual trajectories. In addition, or alternatively, the resident vehicle subsystem may include a vehicle navigation system with an electronic display device. In this example, the control operation may include saving lane-level data, including the number of driving lanes and the extracted virtual trajectories for the driving lanes, in a memory-stored map database. An indication of one or more of the extracted virtual trajectories may be displayed on the vehicle's electronic display device.

The above summary is not intended to represent every embodiment or every aspect of the present disclosure. Rather, the foregoing summary merely provides an exemplification of some of the novel concepts and features set forth herein. The above features and advantages, and other features and attendant advantages of this disclosure, will be readily apparent from the following detailed description of illustrated examples and representative modes for carrying out the present disclosure when taken in connection with the accompanying drawings and the appended claims. Moreover, this disclosure expressly includes any and all combinations and subcombinations of the elements and features presented above and below.

BRIEF DESCRIPTION OF THE DRAWINGS

FIG. 3 is a flowchart of a start point/end point detection algorithm for deriving road segment turning window data, which may correspond to memory-stored instructions executed by onboard or remote control-logic circuitry, programmable electronic control unit, or other computer-based device or network of devices in accord with aspects of the disclosed concepts.

FIG. 4 is a flowchart of a clustering algorithm for deriving a number of turning lanes for a given road segment, which may correspond to memory-stored instructions executed by onboard or remote control-logic circuitry, programmable electronic control unit, or other computer-based device or network of devices in accord with aspects of the disclosed concepts.

Figure 1:
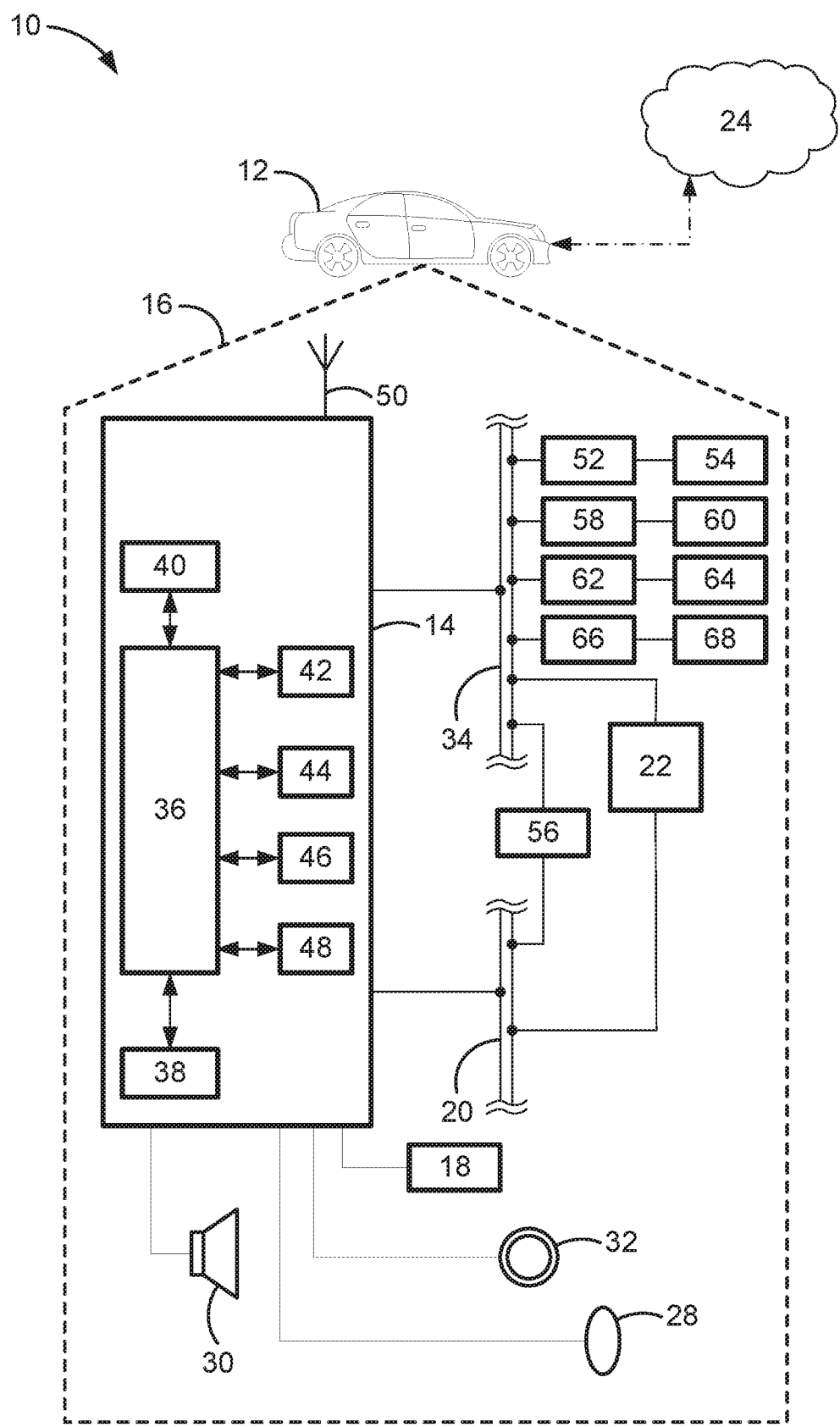
FIG. 1 is a schematic illustration of a representative motor vehicle with a network of in-vehicle controllers, sensing devices, and communication devices for executing automated and/or autonomous driving operations in accordance with aspects of the present disclosure.

The present disclosure is amenable to various modifications and alternative forms, and some representative embodiments are shown by way of example in the drawings and will be described in detail herein. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed by the appended claims.

DETAILED DESCRIPTION

This disclosure is susceptible of embodiment in many different forms. There are shown in the drawings and will herein be described in detail representative embodiments of the disclosure with the understanding that these representative examples are provided as an exemplification of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "approximately," and the like, may be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a normal driving surface.

Referring now to the drawings, wherein like reference numbers refer to like features throughout the several views, there is shown in FIG. 1 a representative automobile, which is designated generally at 10 and portrayed herein for purposes of discussion as a sedan-style passenger vehicle. Packaged on a vehicle body 12 of the automobile 10, e.g., distributed throughout the different vehicle compartments, is an onboard network of electronic devices for executing one or more assisted or automated driving operations. The illustrated automobile 10—also referred to herein as "motor vehicle" or "vehicle" for short—is merely an exemplary application with which aspects and features of this disclosure may be practiced. In the same vein, implementation of the present concepts for the specific computing network architecture discussed below should also be appreciated as an exemplary application of the novel features disclosed herein. As such, it will be understood that aspects and features of this disclosure may be applied to other system architectures, utilized for various automated driving operations, and implemented for any logically relevant type of motor vehicle. Moreover, only select components of the network and vehicle have been shown and will be described in additional detail below. Nevertheless, the motor vehicles and network architectures discussed herein may include numerous additional and alternative features, and other available peripheral components, for example, for carrying out the various methods and functions of this disclosure. Lastly, the drawings presented herein are not necessarily to scale and are provided purely for instructional purposes. Thus, the specific and relative dimensions shown in the drawings are not to be construed as limiting.

The representative vehicle 10 of FIG. 1 is originally equipped with a vehicle telecommunication and information ("telematics") unit 14 that wirelessly communicates (e.g., via cell towers, base stations and/or mobile switching centers (MSCs), etc.) with a remotely located or "off-board" cloud computing system 24. Some of the other vehicle hardware components 16 shown generally in FIG. 1 include, as non-limiting examples, an electronic video display device 18, a microphone 28, one or more audio speakers 30, and assorted input controls 32 (e.g., buttons, knobs, switches, trackpads, keyboards, touchscreens, etc.). Generally, these hardware components 16 function, in part, as a human/machine interface (HMI) to enable a user to communicate with the telematics unit 14 and other systems and system components of the vehicle 10. Microphone 28 provides a vehicle occupant with means to input verbal or other auditory commands; the vehicle 10 may be equipped with an embedded voice-processing unit programmed with a computational speech recognition software module. Conversely, speaker 30 provides audible output to a vehicle occupant and may be either a stand-alone speaker dedicated for use with the telematics unit 14 or may be part of audio system 22. The audio system 22 is operatively connected to a network connection interface 34 and an audio bus 20 to receive analog information, rendering it as sound, via one or more speaker components.

Communicatively coupled to the telematics unit 14 is a network connection interface 34, suitable examples of which include twisted pair/fiber optic Ethernet switch, internal/external parallel/serial communication bus, a local area network (LAN) interface, a controller area network (CAN), a media-oriented system transfer (MOST), a local interconnection network (LIN) interface, and the like. Other appropriate communication interfaces may include those that conform with ISO, SAE, and IEEE standards and specifications. The network connection interface 34 enables the vehicle hardware 16 to send and receive signals with each other and with various systems and subsystems both within or "resident" to the vehicle body 12 and outside or "remote" from the vehicle body 12. This allows the vehicle 10 to perform various vehicle functions, such as controlling vehicle steering, governing operation of the vehicle's transmission, controlling engine throttle, engaging/disengaging the brake system, and other automated driving functions. For instance, telematics unit 14 receives and/or transmits data to/from an ADAS electronic control unit (ECU) 52, an engine control module (ECM) 54, a powertrain control module (PCM) 56, sensor interface module(s) 58, a brake system control module (BSCM) 60, and assorted other vehicle ECUs, such as a transmission control module (TCM), a climate control module (CCM), etc.

With continuing reference to FIG. 1, telematics unit 14 is an onboard computing device that provides a mixture of services, both individually and through its communication with other networked devices. This telematics unit 14 is generally composed of one or more processors 40, each of which may be embodied as a discrete microprocessor, an application specific integrated circuit (ASIC), a dedicated control module, etc. Vehicle 10 may offer centralized vehicle control via a central processing unit (CPU) 36 that is operatively coupled to one or more electronic memory devices 38, each of which may take on the form of a CD-ROM, magnetic disk, IC device, semiconductor memory (e.g., various types of RAM or ROM), etc., and a real-time clock (RTC) 42. Long-range vehicle communication capabilities with remote, off-board networked devices may be provided via one or more or all of a cellular chipset/component, a navigation and location chipset/component (e.g., global positioning system (GPS) transceiver), or a wireless modem, all of which are collectively represented at 44. Close-range wireless connectivity may be provided via a short-range wireless communication device 46 (e.g., a BLUETOOTH® unit or near field communications (NFC) transceiver), a dedicated short-range communications (DSRC) component 48, and/or a dual antenna 50. It should be understood that the vehicle 10 may be implemented without one or more of the above listed components, or may include additional components and functionality as desired for a particular end use. The various communications devices described above may be configured to exchange data as part of a periodic broadcast in a V2V communication system or a vehicle-to-everything (V2X) communication system, e.g., Vehicle-to-Infrastructure (V2I), Vehicle-to-Pedestrian (V2P), and/or Vehicle-to-Device (V2D).

CPU 36 receives sensor data from one or more sensing devices that use, for example, photo detection, radar, laser, ultrasonic, optical, infrared, or other suitable technology for executing an automated driving operation. In accord with the illustrated example, the automobile 10 may be equipped with one or more digital cameras 62, one or more range sensors 64, one or more vehicle speed sensors 66, one or more vehicle dynamics sensors 68, and any requisite filtering, classification, fusion and analysis hardware and software for processing raw sensor data. Digital camera 62 may use a charge coupled device (CCD) sensor or other suitable optical sensor to generate images indicating a field-of-view of the vehicle 10, and may be configured for continuous image generation, e.g., at least about 35 images generated per second. By way of comparison, range sensor 64 may emit and detect reflected radio, electromagnetic, or light-based waves (e.g., radar, EM inductive, Light Detection and Ranging (LIDAR), etc.) to detect, for example, presence, geometric dimensions, and/or proximity of an object. Vehicle speed sensor 66 may take on various forms, including wheel speed sensors that measure wheel speeds, which are then used to determine real-time vehicle speed. In addition, the vehicle dynamics sensor 68 may be in the nature of a single-axis or a triple-axis accelerometer, an angular rate sensor, an inclinometer, etc., for detecting longitudinal and lateral acceleration, yaw, roll, and/or pitch rates, or other dynamics related parameter. Using data from the sensing devices 62, 64, 66, 68, the CPU 36 identifies objects within a detectable range of the vehicle 10, and determines attributes of the target object, such as size, relative position, angle of approach, relative speed, etc.

In general, disclosed systems, methods and devices help to derive lane-level roadway information, such as lane separation and estimated trajectories, for specified road segments using baseline road-level map data and by mining vehicle dynamics data traces. Roadway navigation maps, such as those made available through the OPENSTREET-MAP® collaborative project, are used as a baseline source to derive an initial estimate of lane-level intersection topology. This baseline "road-level" information may include a road segment count indicative of a number of road segments meeting at a given intersection, the name/names of the intersecting road segments, and basic lane alignment information (i.e., plan-view geometry). From this road-level data, the system is able to estimate a centerline and one or more turning angles (if any) for a road segment under analysis. Lane-specific turning window estimates are generated based on aggregated yaw rate and heading data of participatory vehicles. A lane-specific turning window estimate may generally comprise a distinct start heading, a distinct end heading, and a distinct turning angle for a given turn from a specific lane. Vehicle dynamics data used for turning window estimation may be generated, at least in part, by a large volume of vehicles participating as "crowd-sourced" sensors, e.g., using GPS information and vehicle Controller Area Network (CAN) bus data.

From the turning window estimate and corresponding map-matched vehicle dynamics data, sets of lane-specific start and end points are derived by juxtaposing changes in vehicle yaw rate against a calibrated threshold estimation. A clustering algorithm is then used to assign start points, end points, etc., to corresponding groups based on perpendicular distances to road center lines. By estimating a total number of cluster groups, the system is able to derive an estimated number of drivable lanes for each segment of a particular intersection. Each cluster is then analyzed to generate a virtual trajectory for the corresponding turn from a specific lane, including entry (IN) and exit (OUT) centerlines and an estimated path with a corresponding turning angle. The foregoing techniques help to derive lane-level details for roadway intersections and other road segments in navigation map databases, which in turn helps to improve the integrity and functionality of automated and assisted vehicle navigation systems. Disclosed statistical techniques also help to enable accurate, real-time lane-level data retrieval using baseline map database information and contributing "crowd-sourced" vehicles as sensors. This, in turn, helps to eliminate the need for dedicated survey vehicles and, thus, significantly reduces the time and costs associated with updating database-stored roadway information.

Figure 2:
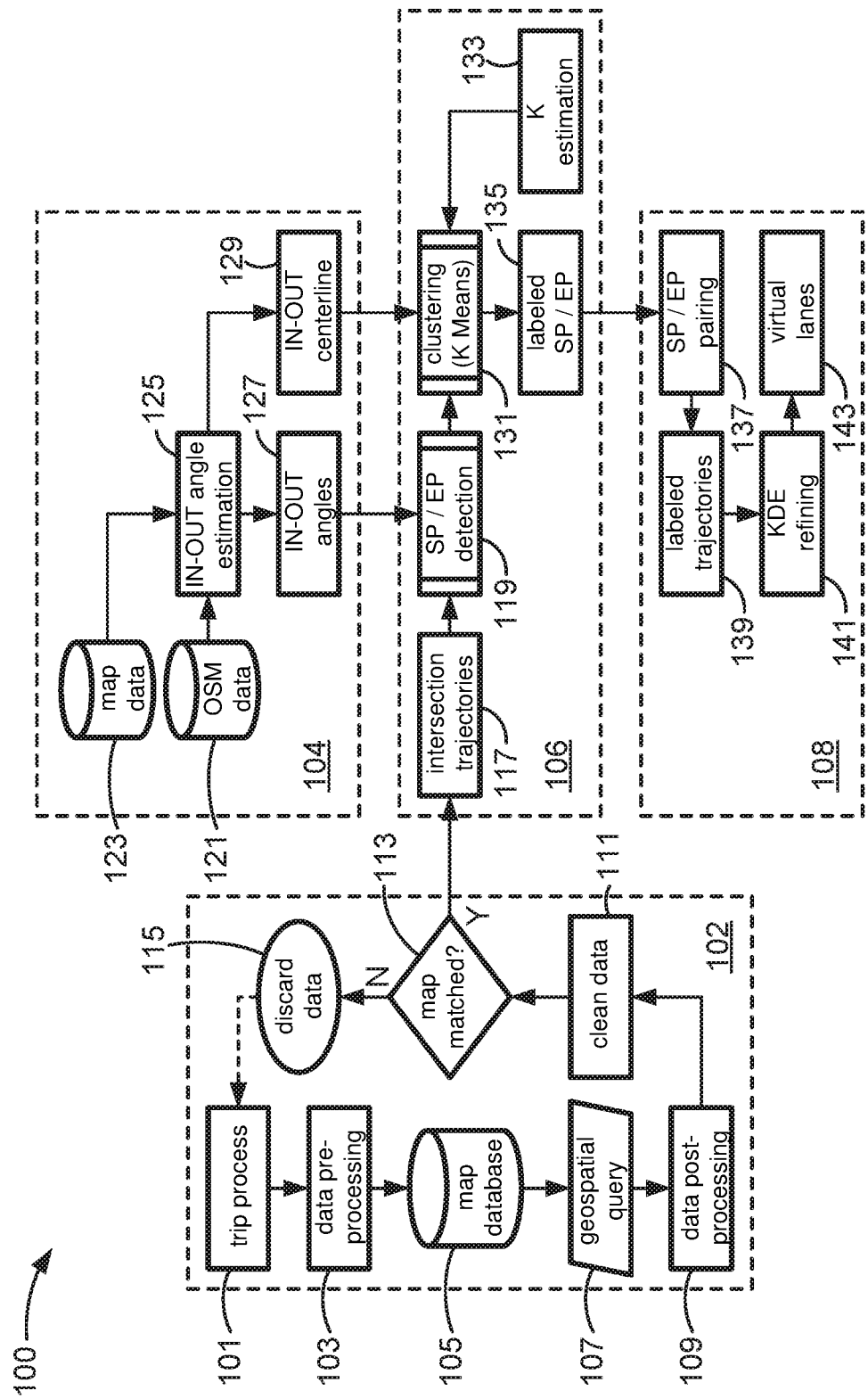
FIG. 2 is a flowchart of a multi-lane separation and trajectory extraction algorithm for deriving lane-level road segment data, which may correspond to memory-stored instructions executed by onboard or remote control-logic circuitry, programmable electronic control unit, or other computer-based device or network of devices in accord with aspects of the disclosed concepts.

With reference now to the flow chart of FIG. 2, an improved method or control strategy for deriving lane-level road segment data using map-matching, turning-window estimation, dynamics data clustering, and lane trajectory extraction techniques is generally described at 100 in accordance with aspects of the present disclosure. Some or all of the operations illustrated in FIG. 2 and described in further detail below may be representative of an algorithm that corresponds to processor-executable instructions that may be stored, for example, in main or auxiliary or remote memory, and executed, for example, by an onboard or remote controller, processing unit, control logic circuit, or other module or device, to perform any or all of the above or below described functions associated with the disclosed concepts. It should be recognized that the order of execution of the illustrated operation blocks may be changed, additional blocks may be added, and some of the blocks described may be modified, combined, or eliminated.

Method 100 begins at process block 101 with processor-executable instructions for a programmable controller or control module or similarly suitable processor or server computer to begin a Trip Processing protocol 102 that is designed to aggregate vehicle location and dynamics data from participating "crowd-sourced" vehicles. The Trip Processing protocol 102, as well as the Intersection Matching protocol 104, Lane Separation protocol 106 and Virtual Trajectories Extraction protocol 108 described below, may be executed in real-time, continuously, systematically, sporadically and/or at regular intervals, for example, each 100 milliseconds, etc., during ongoing system operation. As yet another option, protocols 102, 104, 106 and/or 108 may initialize responsive to a prompt signal received from a backend or middleware computing node tasked with collecting, analyzing, sorting, storing and distributing roadway information. Process block 101 may sample connected vehicle data composed of vehicle location information (e.g., GPS-generated latitude, longitude, and elevation geodetic datums), and vehicle dynamics information (e.g., speed, heading, acceleration (x, y, z components), yaw rate, etc.).

Once a sufficient amount of data is collected at process block 101, the method 100 continues to process block 103 to perform a data pre-processing routine. This pre-processing routine may be implemented, for example, to minimize or otherwise eliminate duplicative records, outliers, and data errors by using distance estimation, heading angle estimation, probabilistic data filtering, data smoothing protocols, or other applicable techniques. Aggregated and processed data is stored in a map database 105 through collaborative operation between a database-management system (DBMS) and a high-speed, server-class database computer. Map database 105 may take on many forms, including a special-purpose 3D mapping server database that supplies map-related data in association with global coordinates, frequently describing positions in terms of a latitudinal position, a longitudinal position, and a height or elevation. Coordinating operation of a GPS device in collaboration with a 3D mapping server database may be utilized to not only position a vehicle with respect to a cataloged road geometry, but also to place the vehicle in the context of road details, such as road name, speed limit, surface type, incline, bank gradient, etc.

With continuing reference to FIG. 2, the method 100 provides memory-stored, processor-executable instruction to execute a geospatial query at input/output block 107. By way of example, and not limitation, the query conducted at block 107 may utilize a vehicle's real-time location information (i.e., GPS-generated positional data as described above) and temporal information (i.e., a vehicle timestamp) to identify location-specific geographic information. Geospatial information may include, in some non-limiting examples, shoulder location data, road center location data, road boundary location and geometry data, intersection midpoint location data, etc. Post-processing of data retrieved from the map database 105 is conducted at process block 109. A post-processing procedure may include converting retrieved data to one or more target file format types (e.g., comma-separated values (CSV) file, JavaScript Object Notation (JSON) file, etc.) which may be needed for interoperability with other systems/applications. Once processed, the data is "cleaned" at process block 111 before being released for computational purposes. Generally, data cleaning may be applied to large data sets in order to scrub the data and thereby improve the accuracy of a large data set. Data cleaning may eliminate observable transcription errors, correct erroneous entries, such as invalid codes, update missing data, and reconcile instances of multiple sources and definitions of data.

Method 100 continues to decision block 113 to determine if the processed and cleaned data can be matched to an existing data set. In accord with the disclosed implementation, trip data—a set of data points following the order of a specific vehicle trip, including predecessor and successor points for each trip data point—is associated with one or more related data sets in an existing map database system. By matching a given vehicle trip to a roadway navigation map system, the method 100 is able to extract data sets that contain road-level information for further processing. If it is decided that a set of processed and cleaned data cannot be matched to an existing data set (block 113=NO), the method proceeds to process block 115 and discards that particular data set. At this juncture, the method 100 may circle back to block 101 and run in a continuous loop or may temporarily terminate. Upon determining that the processed and cleaned data from process blocks 109 and 111 can be linked to an existing data set (block 113=YES), the method 100 proceeds to the Intersection Matching, Lane Separation and Virtual Trajectories Extraction protocols 104, 106, 108.

Execution of the Lane Separation protocol 106 may begin at process block 117 with memory-stored, processor-executable instructions to extract from the Trip Processing protocol 102 trip data and attendant trajectory information for a given roadway segment under investigation. Retrieved trip and trajectory data may include, for example, in-vehicle, sensor-generated vehicle dynamics data procured by third-party motor vehicles and mapped to a specific intersection. Start Point (SP) and End Point (EP) detection for a specific driving maneuver is carried out at predefined process block 119 utilizing information afforded by the Trip Processing protocol 102 and Intersection Matching protocol 104. For at least some of the disclosed implementations, the method 100 accesses an OSM database 121 to "lookup" road-level data associated with a given intersection; from this data, an intersection center point is identified and a bounding box of any desired shape is generated to demarcate geographical boundaries of the intersection. Contemporaneous with identifying road-level data, geometric topology information of the intersection is retrieved from a road map database 123.

Using the information from the OSM database 121 and the road map database 123, the method 100 conducts an IN-OUT turning angle estimation at process block 125. In general, process block 125 provides instructions for identifying a road segment entry (IN) angle $\delta_{IN}$ and a road segment exit (OUT) angle $\delta_{OUT}$ relative to an intersection center point, which may be designated with coordinates $(x_0, y_0)$. Spatial relationships within a map-based representation of a given road segment may be specified relative to a two-dimensional (2D) Cartesian coordinate plane. If the origin of the Cartesian space is set to coincide with the intersection center point $(x_0, y_0)$, road-level centerlines for the given intersection can be represented as a linear function: y=ax+b, where x, y are variables for two independent dimensions, and b=0. In this example, a turning angle $\theta_T$ (e.g., clockwise degrees, North=0 degrees, South=180 degrees), an entry centerline $L_{IN}$, and an exit centerline $L_{OUT}$ for the intersection may be calculated as:

$$\theta_T = \delta_{OUT} - \delta_{IN}$$

$$L_{IN}: (y_{IN} - y_0) = \delta_{IN}(x_{IN} - x_0)$$

$$L_{OUT}: (y_{OUT} - y_0) = \delta_{OUT}(x_{OUT} - x_0)$$

with entry point coordinates $x_{IN}$, $y_{IN}$, and exit point coordinates $x_{OUT}$, $y_{OUT}$. An estimated IN/OUT turning angle is identified at process block 127 and estimated IN and OUT centerlines are identified at process block 129. Each center line may be represented by a set of GPS datum points.

Now that the Intersection Matching protocol 104 is complete, the SP, EP detection in predefined process block 119 of Lane Separation protocol 106 may be conducted to derive a respective start point and a respective end point for a specific turning maneuver at the given intersection. SP, EP detection may start with estimating a respective start heading $H_1$, a respective end heading $H_2$, and a respective turning angle $\theta_1$ for each driving lane of a given intersection. The method 100 utilizes stable start/end headings extracted from vehicle location and dynamics data of multiple participatory vehicles to estimate the lane start and end headings. For at least some implementations, the start heading $H_1$ may be equal to the entry (approaching) angle $\delta_{IN}$ and the end heading $H_2$ may be equal to the exit (departing) angle $\delta_{IN}$. In this instance, the turning angle $\theta_1$ may be estimated as $\theta_1 = \int Y dt$, where Y is a yaw rate and dt is a time derivative.

FIG. 3 presents a representative SP/EP detection method 200 for finding a start point and an end point for a road segment turning window from the aforementioned trip data. Each respective start point SP may be identified as a discrete first road location whereat the yaw rate Y for a collective of motor vehicles begins to increase/decrease away from a calibrated threshold estimate $\lambda$. Conversely, each respective end point EP may be identified as a discrete second road location whereat the yaw rate Y for the collective of motor vehicles has increased/decreased back to the calibrated threshold estimate $\lambda$. At process block 201 of FIG. 3, the method 200 retrieves trip data corresponding to the given intersection under analysis. At decision block 203, it is determined whether or not the estimated start heading $H_1$ extracted from this trip data is equal to the entry angle $\delta_{IN}$ extracted from road-level data. If it is not (block 203=NO), the method 200 advances to NEXT operation 205 with instructions to retrieve the next data set, and concomitantly iterates back to process block 201. Responsive to a determination that the estimated start heading $H_1$ is equal to the entry angle $\delta_{IN}$ (block 203=YES), the method 200 shifts to decision block 207 to conduct a dynamic window detection inquiry.

Continuing with the above discussion of method 200 of FIG. 3, decision block 207 detects: (1) if an inception yaw rate $Y_{t0}$—the yaw rate Y at timestamp to when vehicle yaw begins to change—is greater than or equal the calibrated threshold estimate $\lambda$; (2) if a termination yaw rate $Y_{t1}$—the yaw rate Y at timestamp $t_1$ when vehicle yaw returns to zero and reaches equilibrium—is greater than or equal the calibrated threshold estimate $\lambda$; and (3) if the integral of yaw rate $\int Y dt$ from timestamp $t_0$ to $t_1$ is equal to the turning angle $\theta_1$. If any one of the above-enumerated inquiries comes back as negative (block 207=NO), the method 200 proceeds to NEXT operation 205 as discussed above. However, upon determining that $Y_{t0} \geq \lambda$ and $Y_{t1} \geq \lambda$ and $\int_{t0}^{t1} Y d = \theta 1$ (block 207=YES), the method 200 proceeds to decision block 209 to assess whether or not the estimated end heading $H_2$ extracted from this trip data is equal to the exit angle $\delta_{OUT}$. If it is not (block 209=NO), the method 200 once again proceeds to NEXT operation 205. On the other hand, if the estimated end heading $H_2$ is equal to the exit angle $\delta_{OUT}$ (block 209=YES), the final estimated start and end points are selected and stored at decision block 211.

With reference again to the Lane Separation protocol 106 of FIG. 2, method 100 completes the SP, EP detection of predefined process block 119 and proceeds to conduct a clustering algorithm to derive a total number of clusters and corresponding cluster heads at predefined process block 131. For at least some applications, the system applies a k-means clustering analysis, which may include a vector quantization (VQ) processing technique, to data mine the detected start point and end point information, and group the mined start points and end points into corresponding clusters based on centerline offset distances, i.e., perpendicular distances from start point to entry centerline and end point to exit centerline. Clustering at process block 131 is performed contemporaneous with a K-estimation protocol at process block 133 to estimate a number K of lanes for each road segment. K-space trajectory estimation techniques may be based on an anisotropic gradient delay model with additional deviation and distortion compensation. Upon completion of clustering (block 119) and K-estimation (block 131), a labeled SP, EP operation is carried out at process block 135 to label each SP/EP with a corresponding cluster identification indicium.

FIG. 4 presents a representative clustering method 300 for deriving a number of turning lanes for a given road segment. Method 300 begins with retrieving start point and end point data, e.g., as respective Cartesian coordinates SP(X, Y) and EP(X, Y), at process block 301. Once retrieved, centerline offset distances are estimated at process block 303. According to the illustrated example, a centerline offset is the perpendicular distance between an SP/EP point to a corresponding center line. Centerline offset distances may be calculated as a respective perpendicular distance PD from the centerline as:

$$\frac{|aX + bY + c|}{\sqrt{(a^2 + b^2)}}$$

where X and Y are Cartesian coordinates for a start point or end point, a is an entry angle (e.g., a=$\delta_{IN}$), b is an integer (e.g., b=−1), c=$y_0$−$\delta_{IN}x_0$, with an entry angle $\delta_{IN}$ and intersection center point coordinates $x_0$, $y_0$, and aX+bY+c is a linear equation representing the center line, which may be set equal to zero (0).

Continuing with the above discussion of method 300 of FIG. 4, process block 305 identifies a number of driving lanes for a given roadway intersection by estimating a number of clusters for the SP/EP data. Processing trajectory data with a clustering algorithm to derive a number of driving lanes may include, for example, estimating a number of clusters K as:

$$K=\text{Max}(\text{Diff}_{pd})/W_{lane}.$$

where $\text{Diff}_{pd}$ is a difference among start points centerline offset distances or end points centerline offset distances; and $W_{lane}$ is a standardized lane width corresponding to the designated road segment. K-means clustering is carried out at process block 307, with cluster centroids determined at process block 309. These two procedures attempt to classify a given data set through a derived number of clusters by defining k centroids, one for each cluster. These centroids may be placed in a calculated fashion, and subsequently take each data point belonging to a given data set and associate it to the nearest centroid. The algorithm works iteratively to assign each data point to one of k groups based on the features fixed a priori. Rather than defining groups before looking at the data, clustering allows you to find and analyze the groups that have formed organically. At process block 311, a labeled SP, EP procedure is carried out to assign labels for the trajectory data, namely each SP/EP is assigned to a single cluster. Trip pairing is carried out at process block 313, and trip labels are assigned at process block 315.

Returning again to FIG. 2, the Virtual Trajectories Extraction protocol 108 begins at process block 137 with start-point pairing and end-point pairing. The SP, EP pairing procedure pairs start points and end points for different combinations, with each pairing result indicating a specific type of turn. At process block 139, a labeled trajectories procedure is carried out to label each trajectory based on a specific SP, EP pairing result. Method 100 thereafter executes a Kernel Density Estimation (KDE) refining process at a process block 141 to refine the virtual lane extraction results by estimating a density of labeled trajectories. A virtual lanes procedure is then carried out at process block 143 to extract results to virtualize the lane information for each type of turning maneuver.

Aspects of this disclosure may be implemented, in some embodiments, through a computer-executable program of instructions, such as program modules, generally referred to as software applications or application programs executed by an onboard vehicle computer or a distributed network of resident and remote computing devices. Software may include, in non-limiting examples, routines, programs, objects, components, and data structures that perform particular tasks or implement particular data types. The software may form an interface to allow a resident vehicle controller or control module or other suitable integrated circuit device to react according to a source of input. The software may also cooperate with other code segments to initiate a variety of tasks in response to data received in conjunction with the source of the received data. The software may be stored on any of a variety of memory media, such as CD-ROM, magnetic disk, bubble memory, and semiconductor memory (e.g., various types of RAM or ROM).

Moreover, aspects of the present disclosure may be practiced with a variety of computer-system and computer-network architectures, including multiprocessor systems, microprocessor-based or programmable-consumer electronics, minicomputers, mainframe computers, master-slave, peer-to-peer, or parallel-computation frameworks, and the like. In addition, aspects of the present disclosure may be practiced in distributed-computing environments where tasks are performed by resident and remote-processing devices that are linked through a communications network. In a distributed-computing environment, program modules may be located in both onboard and off-board computer-storage media including memory storage devices. Aspects of the present disclosure may therefore, be implemented in connection with various hardware, software or a combination thereof, in a computer system or other processing system.

Any of the methods described herein may include machine-readable instructions for execution by: (a) a processor, (b) a controller, and/or (c) any other suitable processing device. Any algorithm, software, control logic, protocol, or method disclosed herein may be embodied in software stored on a tangible medium such as, for example, a flash memory, a CD-ROM, a floppy disk, a hard drive, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., it may be implemented by an application specific integrated circuit (ASIC), a programmable logic device (PLD), a field programmable logic device (FPLD), discrete logic, etc.). Further, although specific algorithms are described with reference to flowcharts depicted herein, there are many other methods for implementing the example machine readable instructions that may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method for controlling operation of a motor vehicle, the method comprising:
   determining, via a resident vehicle controller of the motor vehicle, a vehicle location of the motor vehicle;
   conducting a geospatial query to identify a designated road segment corresponding to the vehicle location;
   receiving, from a memory-stored map database, road-level data associated with the designated road segment;
   determining, from the road-level data, a turning angle and a centerline for the designated road segment;
   receiving connected vehicle data indicative of vehicle locations and dynamics for multiple motor vehicles while travelling on the designated road segment;
   determining, from the connected vehicle data, trajectory data indicative of respective start points, end points, and centerline offset distances for the multiple motor vehicles;
   identifying, based on the turning angle and the centerline, a number of driving lanes for the designated road segment, including processing the trajectory data with a clustering algorithm that applies a k-means clustering analysis that identifies the number of driving lanes as an estimated number of clusters, each of the clusters composed of a subset of the start points and/or end points with the corresponding centerline offset distances thereof proximate a common centroid;
   extracting a respective virtual trajectory for each of the driving lanes; and
   transmitting, via the resident vehicle controller, a command signal to a resident vehicle subsystem to execute a control operation based on at least one of the extracted virtual trajectories corresponding to at least one of the driving lanes of the designated road segment, the resident vehicle subsystem including an Advanced Driver Assistance System (ADAS) intersection assistance module, and the control operation including an automated steering maneuver and/or an automated braking maneuver adapted by the ADAS intersection assistance module based on the at least one of the extracted virtual trajectories.

2. The method of claim 1, wherein determining the turning angle for the designated road segment includes:
   determining, from the road-level data, an entry angle $\delta_{IN}$ and an exit angle $\delta_{OUT}$, and
   calculating the turning angle as $\theta_T$, where $\theta_T = \delta_{OUT} - \delta_{IN}$.

3. The method of claim 2, wherein determining the centerline for the designated road segment includes:
   determining, from the road-level data, intersection center point coordinates $x_0$, $y_0$;
   determining an entry centerline $L_{IN}$ as $(y_{IN} - y_0) = \delta_{IN}(x_{IN} - x_0)$; and
   determining an exit centerline $L_{OUT}$ as $(y_{OUT} - y_0) = \delta_{OUT}(x_{OUT} - x_0)$.

4. The method of claim 1, wherein determining the trajectory data includes estimating a respective start heading, a respective end heading, and a respective turning angle for a corresponding one of the driving lanes.

5. The method of claim 4, wherein estimating the respective turning angle includes estimating the turning angle as $\theta_1$, where $\theta_1 = \int Y dt$, and where Y is a yaw rate and dt is a time derivative.

6. The method of claim 5, wherein each of the respective start points is identified as a first location whereat the yaw rate starts to increase or decrease away from a calibrated threshold estimate, and wherein each of the respective end points is identified as a second location whereat the yaw rate increases or decreases back to the calibrated threshold estimate.

7. The method of claim 1, wherein the clustering algorithm identifies the number of driving lanes as the estimated number of clusters K, where:

$$K = \text{Max}(\text{Diff}_{pd})/W_{lane}$$

where $\text{Diff}_{pd}$ is a difference among start points centerline offset distances or end points centerline offset distances; and $W_{lane}$ is a standardized lane width corresponding to the designated road segment.

8. The method of claim 1, wherein determining the centerline offset distances includes calculating, for each of the multiple motor vehicles, a respective perpendicular distance PD from the centerline as:

$$\frac{|aX + bY + c|}{\sqrt{(a^2 + b^2)}}$$

where X and Y are Cartesian coordinates for a start point or end point, a is an entry angle, b is an integer, $c = y_0 - \delta_{IN} x_0$, with an entry angle $\delta_{IN}$ and intersection center point coordinates $x_0$, $y_0$, and $aX + bY + c$ is a linear equation representing the centerline.

9. The method of claim 1, wherein identifying the designated road segment corresponding to the vehicle location includes determining a bounding box that delineates a set of geographical boundaries surrounding the vehicle's location.

10. The method of claim 1, wherein the number of driving lanes for the designated road segment includes first and second driving lanes, and wherein the virtual trajectories include a first virtual trajectory corresponding to the first driving lane and a second virtual trajectory, distinct from the first virtual trajectory, corresponding to the second driving lane.

11. The method of claim 10, wherein the number of driving lanes for the designated road segment includes a third driving lane, and wherein the virtual trajectories include third and fourth virtual trajectories, distinct from the first and second virtual trajectories, corresponding to the third driving lane.

12. The method of claim 1, wherein determining the turning angle and centerline, determining the trajectory data, identifying the number of driving lanes, and extracting the virtual trajectories are executed by a remote system server computer off-board from the motor vehicle.

13. The method of claim 1, wherein the resident vehicle subsystem further includes a vehicle navigation system with an electronic display device, and wherein the control operation further includes saving the number of driving lanes and the extracted virtual trajectories in the memory-stored map database and/or displaying an indication of the at least one of the extracted virtual trajectories on the electronic display device.

14. A method for controlling operation of a motor vehicle, the motor vehicle including a vehicle controller, a vehicle steering system, a vehicle powertrain system, and a vehicle braking system, the method comprising:

receiving, via the vehicle controller of the motor vehicle, geodetic datum indicative of a real-time vehicle location of the motor vehicle;

conducting a geospatial query to identify a designated road segment corresponding to the real-time vehicle location;

receiving, from a memory-stored map database, road-level data including a road segment count and/or lane alignment information of the designated road segment;

determining, from the road-level data, a turning angle and a centerline for the designated road segment;

receiving connected vehicle data indicative of vehicle locations and dynamics for multiple motor vehicles while travelling on the designated road segment;

determining, from the connected vehicle data, trajectory data indicative of respective start points, end points, and centerline offset distances for the multiple motor vehicles;

identifying, based on the turning angle and the centerline, a number of driving lanes for the designated road segment, including processing the trajectory data with a clustering algorithm that identifies the number of driving lanes as an estimated number of clusters K, where:

$$K = \text{Max}(\text{Diff}_{pd})/W_{lane}$$

and where $\text{Diff}_{pd}$ is a difference among start points centerline offset distances or end points centerline offset distances; and $W_{lane}$ is a standardized lane width corresponding to the designated lane road segment;

extracting a respective virtual trajectory for each of the driving lanes; and transmitting, via the vehicle controller to the vehicle steering system, braking system, and/or powertrain system, a command signal to execute an automated steering, braking, and/or speed maneuver based on at least one of the extracted virtual trajectories.

15. The method of claim 14, wherein determining the turning angle for the designated road segment includes:

determining, from the road-level data, an entry angle $\delta_{IN}$ and an exit angle $\delta_{OUT}$, and calculating the turning angle as $\theta_T$, where $\theta_T = \delta_{OUT} - \delta_{IN}$.

16. The method of claim 15, wherein determining the centerline for the designated road segment includes:

determining, from the road-level data, intersection center point coordinates $x_0, y_0$;

determining an entry centerline $L_{IN}$ as $(y_{IN} - y_0) = \delta_{IN}(x_{IN} - x_0)$; and determining an exit centerline $L_{OUT}$ as $(y_{OUT} - y_0) = \delta_{OUT}(x_{OUT} - x_0)$.

17. The method of claim 14, wherein determining the trajectory data includes estimating a respective start heading, a respective end heading, and a respective turning angle for a corresponding one of the driving lanes from the connected vehicle data.

18. The method of claim 17, wherein estimating the respective turning angle includes estimating the turning angle as $\theta_1$, where $\theta_1 = \int Y dt$, and where Y is a yaw rate and dt is a time derivative.

19. The method of claim 18, wherein each of the respective start points is identified as a first location whereat the yaw rate starts to increase or decrease away from a calibrated threshold estimate, and wherein each of the respective end points is identified as a second location whereat the yaw rate increases or decreases back to the calibrated threshold estimate.

20. The method of claim 14, wherein identifying the designated road segment corresponding to the vehicle location includes determining a bounding box that delineates a set of geographical boundaries surrounding the vehicle's location.

* * * * *